United States Patent
Long et al.

(10) Patent No.: US 6,334,155 B1
(45) Date of Patent: Dec. 25, 2001

(54) METHOD AND APPARATUS FOR CONNECTING SIMILAR STACKS WITHOUT USING PHYSICAL DEVICES

(75) Inventors: Lynn Douglas Long, Chapel Hill; Jerry Wayne Stevens, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/193,585

(22) Filed: Nov. 17, 1998

(51) Int. Cl.$^7$ ............................................ G06F 13/00
(52) U.S. Cl. ........................ 709/250; 709/249; 709/324
(58) Field of Search ..................................... 709/224, 221, 709/222, 228, 238, 201, 250, 230, 300, 249, 310, 321, 322, 324

(56) References Cited

U.S. PATENT DOCUMENTS

| | | | |
|---|---|---|---|
| 5,548,723 | * | 8/1996 | Pettus .................................... 709/228 |
| 5,732,213 | * | 3/1998 | Gessel et al. ........................ 709/224 |
| 5,734,865 | * | 3/1998 | Yu ......................................... 709/250 |
| 5,774,660 | * | 6/1998 | Brendel ................................ 709/201 |
| 5,802,306 | * | 9/1998 | Hunt .................................... 709/228 |
| 5,802,307 | * | 9/1998 | Melo .................................... 709/232 |
| 5,828,881 | * | 10/1998 | Wang .................................... 709/314 |
| 6,006,275 | * | 12/1999 | Picazo, Jr. et al. .................. 709/249 |
| 6,014,699 | * | 1/2000 | Ratcliff et al. ....................... 709/224 |
| 6,061,725 | * | 5/2000 | Schwaller ............................. 709/224 |
| 6,078,964 | * | 6/2000 | Ratcliff et al. ....................... 709/300 |
| 6,189,031 | * | 2/2001 | Badger et al. ........................ 709/224 |
| 6,233,619 | * | 5/2001 | Narisi .................................... 709/230 |

OTHER PUBLICATIONS

Takahiro Murooka and Toshiaki Miya. "Protocol stack–based telecom emulator". Automation and test in Europe Conference and Exhibition 2000. p. (s) 186–191.*

S. Zeadally. "Evaluating Sreams –based Protocol Stacks over High–Performance Networks". IEEE May 2001. 0–7803–7001–5/01.*

Bobby Krupczak. "Multi–Subsystem Protocol Architectures: Motivation and Experience with an Adapter–based Approach". INFOCOM'96. Fiteenth Annual Joint Conference IEEE Computer Societies. Mar. 24–28, 1996. IEEE 96CB35887.*

Bjorkman M. "Performance Modeling of Multiprocessor Implementations Protocols". Dept. of Computer System., Uppsala University., Sweden. Network IEEE Jun. 1998. p. (s) 262–273. ISSN: 1063–6692.*

\* cited by examiner

*Primary Examiner*—Dung C. Dinh
*Assistant Examiner*—Seyed M Safavian
(74) *Attorney, Agent, or Firm*—J. W. Herndon; M. L. Doubet

(57) ABSTRACT

The invention interconnects stacks executing the same protocol in the same node by means of a software implemented input/output device, thereby eliminating the need for physical resources otherwise required for data communication between the stacks. First and second connection objects are built in the virtual device in association with the first and second stacks, respectively. An association is also built between the first and second connection objects, thereby enabling communication between the stacks via the first and second connection objects.

14 Claims, 4 Drawing Sheets

Fig. 1 - Prior Art
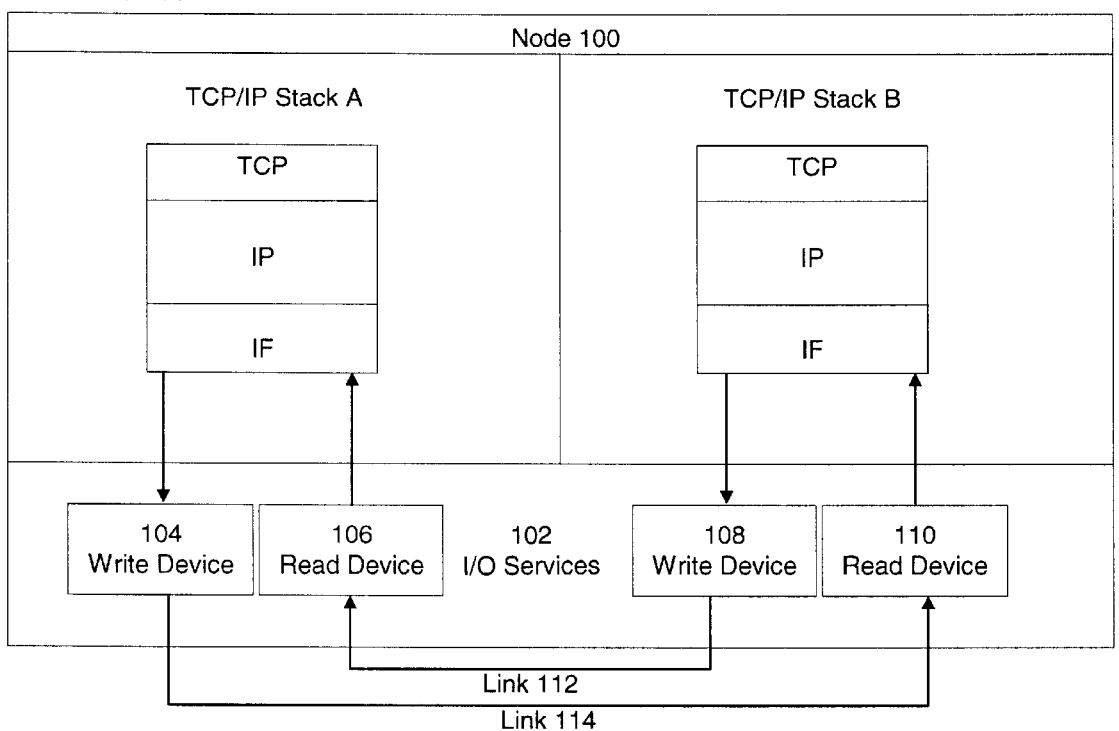
Fig. 2
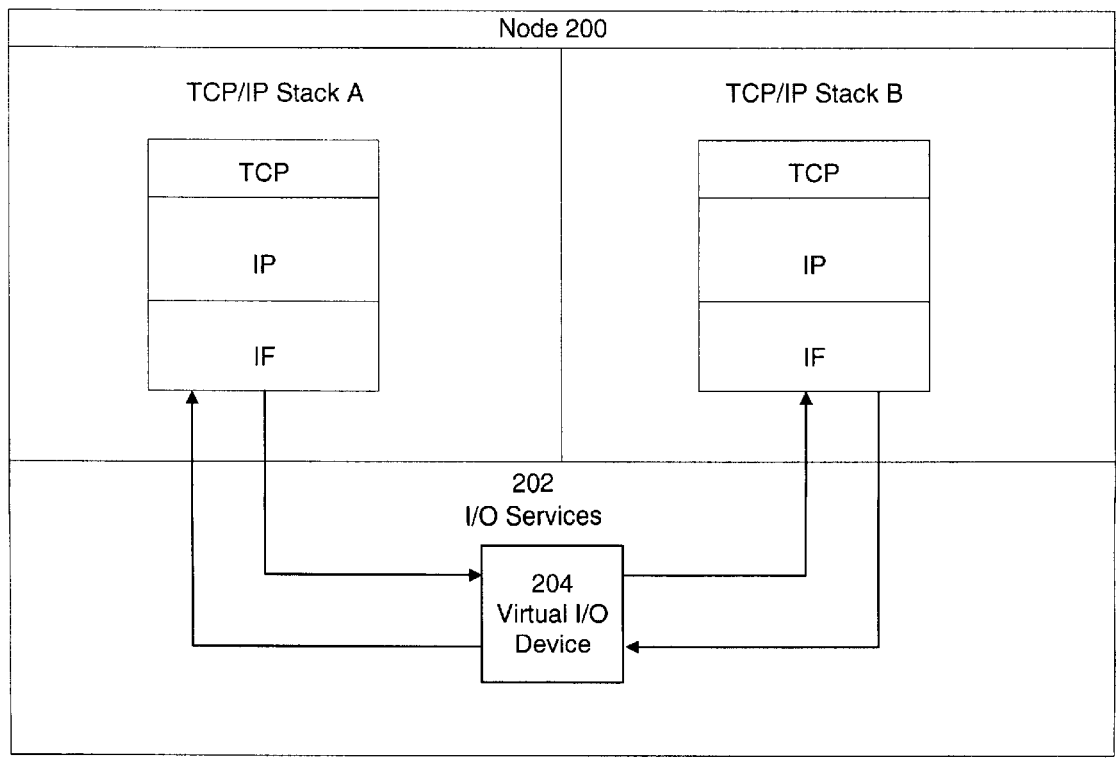

METHOD AND APPARATUS FOR CONNECTING SIMILAR STACKS WITHOUT USING PHYSICAL DEVICES

TECHNICAL FIELD

The invention relates to the field of networking in general and, in particular, to techniques for communicating between similar stacks in a processing node.

BACKGROUND OF THE INVENTION

It is relatively common for a single processing node of a network to run multiple stacks that handle different protocols. For example, a node might contain a TCP/IP stack for communications via the Internet or a corporate intranet, and at the same time run another stack such as perhaps a SNA (System Communications Architecture) stack for communications with IBM mainframes or IBM AS/400 nodes running IBM's APPN (Advanced-Peer-to-Peer) architecture. It is less common for a single node to run multiple stacks of the same type, say two or more TCP/IP stacks as one example. However, for performance reasons, it becomes desirable to run multiple stacks when the traffic load exceeds that which can be processed efficiently through a single stack. Naturally, if multiple similar stacks are executing in a single node, then occasions arise in which packets must be passed between two of the similar stacks. For example, if application A, which is served by stack A, wishes to communicate with application B, which is served by stack B, then the A and B stacks must communicate with each other in the same manner as if stacks A and B were in different nodes. In fact, in the prior art, this is exactly how this inter-stack communication is accomplished. Actual physical links are assigned between the stacks in the same manner as physical links are assigned between stacks in different nodes.

FIG. 1 shows an example of this prior art arrangement. FIG. 1 shows a node 100 and two TCP/IP stacks A and B within the node 100. Communications are established between the two stacks A and B using physical links 112 and 114 and write and read devices, such as 104 through 110. The write and read devices 104 and 106 might be contained within the same communications adapter card. The same is true for devices 108 and 110. However, this is not necessarily true in all cases, and four separate devices may be required for this full-duplex connection. Also associated with the read and write devices are conventional control blocks (not shown) which are used to administer the devices. The physical links 112 and 114 are assigned in a conventional manner between the stacks, as if the stacks were in different nodes. Thus, it is apparent that, while this arrangement is satisfactory from a functional point of view, it requires real resources that can become expensive and difficult to administer.

SUMMARY OF THE INVENTION

The invention eliminates the need for physical resources to interconnect multiple and similar protocol stacks in a single node. This is accomplished by means of a virtual input/output device to replace the physical resources. "Virtual" here means that the device is implemented in software and provides all of the functions necessary to interconnect the stacks. The invention eliminates the need for physical links, read and write devices and control blocks as is required in the prior art.

In the preferred embodiment, a virtual input/output device implemented in software interconnects first and second stacks, both of which are executing the same protocol. A first connection object is established in the virtual input/output device in association with the first stack. A second connection object is established in the virtual input/output device in association with the second stack. An association is established in the virtual input/output device between the first connection object and the second connection object. This arrangement allows data communications between the first and second stacks via the first connection object and the second connection object of the virtual input/output device.

The first and second connection objects are built in the virtual input/output devicein response to a system or operator request to activate the virtual input/output device. As a result of this, a first service access point object is established in the virtual input/output device in association with the first stack and a second service access point object is established in the virtual input/output device in association with the second stack. A service access point object is a control block created to represent the user. For our purposes, the user can be thought of as a protocol stack. The SAP object holds status, user characteristics, addresses, tokens, etc. It anchors all subsequent related objects, such as protocol filter objects and the objects that represent the actual ene-to-end connection in a hierarchical order.

After the service access point objects are established, a first protocol filter object is established in association with the first stack and a second protocol filter object is established in association with the second stack. The protocol filter objects determine the protocol to be used by the first and second connection objects, respectively. The first and second connection objects are built after the service access point objects and the protocol filter objects have been established

BRIEF DESCRIPTION OF THE DRAWING

FIG. 1 shows a prior art technique of interconnecting multiple and similar stacks in a single node. As shown, the technique consists of attaching read and write devices and physical connecting links between the stacks, as if the stacks were in different nodes;

FIG. 2 shows the same arrangement as FIG. 1, with the elimination of the read and write devices and the physical links by means of a virtual I/O device that provides all of the functionality required to communicate between the stacks;

DETAILED DESCRIPTION

FIG. 2 shows essentially the same arrangement as FIG. 1, but with the invention, Virtual I/O Device 204 replacing the physical links, read and write devices and control blocks of FIG. 1. FIG. 2 shows a node 200 equipped with two TCP/IP stacks A and B. It should be understood that TCP/IP stacks are used as an example and that stacks of any type of networking protocol may fall within the scope and spirit of the invention. The Virtual I/O Device 204 is illustratively shown to reside in an I/O services area 202 of node 200. In this illustrative embodiment, the node illustratively is an IBM System/390 mainframe equipped with an MVS operating system and access software, such as IBM's Virtual Telecommunications Access Method. The I/O services 202 component of the node 202 is part of VTAM. MVS and VTAM are well known and understood by workers in the art and no detailed discussion of their operation is deemed necessary for an understanding of the invention.

Figure 3:
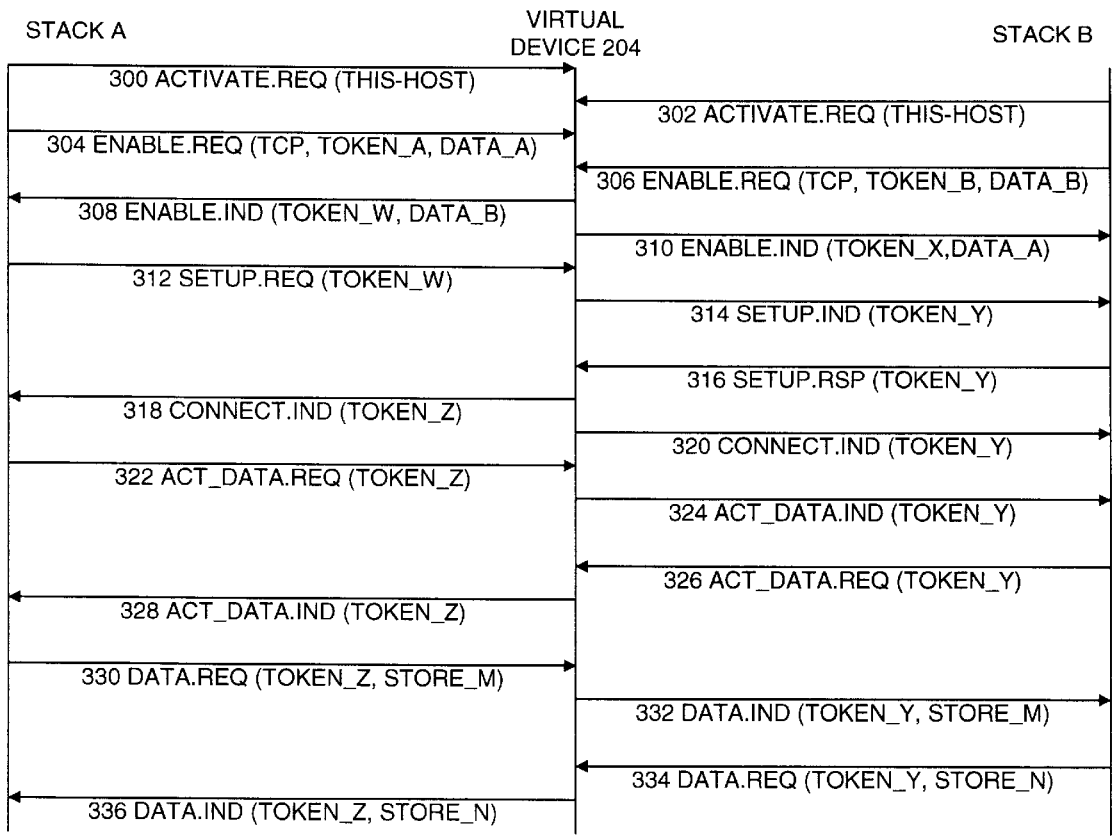
FIG. 3 shows message flows between two similar stacks and the virtual I/O device that are used to establish the objects in the virtual device, also in the stacks, to enable communication between the stacks.

FIG. 3 illustrates message flows between the two stacks and the virtual I/O device 202 of FIG. 2 that activate communications between the stacks. Messages flowing from a stack to virtual device 204 are referred to as requests, abbreviated as .REQ in FIG. 2. As will be seen, communication between the stacks via virtual device 204 uses token addressing, as contrasted with the standard addressing schemes used by TCP/IP for communication external to the node. External communications would occur between the interface layer (IF) and a real device also residing in the I/O services 202 portion of node 200. Such devices for external communications is omitted from FIG. 2 as being unrelated to the invention. Returning to internal communication between the stacks via virtual device 204, if a request message is accepted by virtual device 204, a confirm message is returned to the stack that originated the request message. Confirm messages are omitted from FIG. 2 for simplicity. A stack may also respond to a request message with a response message (abbreviated as .RSP) in FIG. 2. Messages flowing from virtual device 204 to a stack which contain new information, i.e. not confirm messages, are referred to as indications (abbreviated as .IND in FIG. 2). The software that forms a stack is configured with a predefined reserved name, such as THIS-HOST, that represents the virtual device 204. When a node operator or system procedure wishes to establish communications between the stacks A and B of FIG. 2, the operator or procedure issues a system command to activate the device "THIS-HOST". The message flows depicted in FIG. 3 result and establish the desired communication between the stacks. There are no required definitions in the I/O services area 202 of the node 200 or in the virtual device 204.

Figure 4:
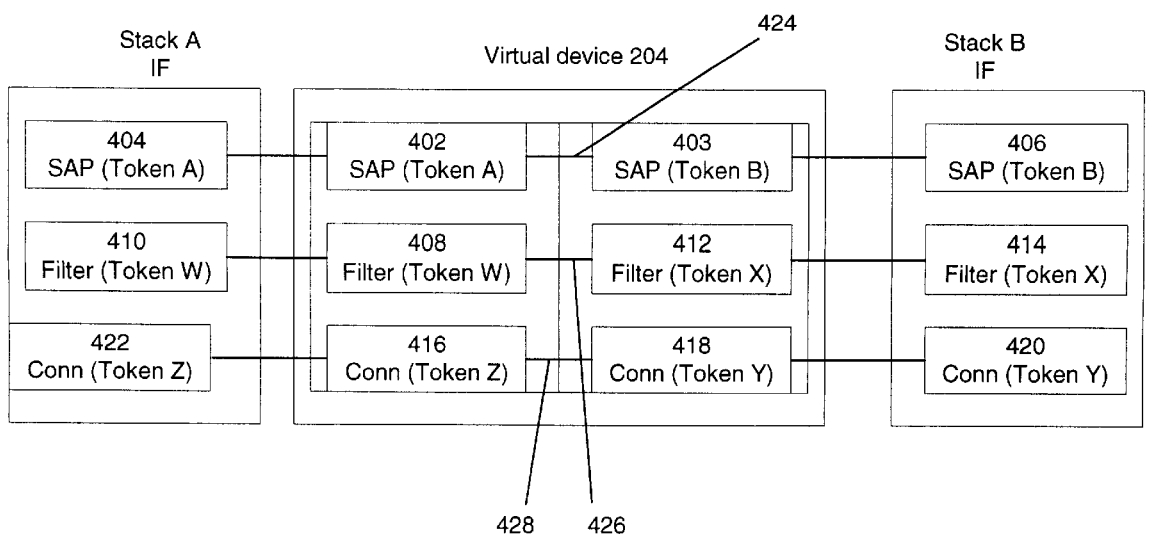
FIG. 4 shows a block diagram of the two stacks and the virtual I/O device and the objects established by the messages of FIG. 3.

Reference is now made to FIG. 3, which shows the message flows between the similar stacks A and B and virtual device 204 which establish data communication between the stacks via the virtual device 204. The vertical line at the left of FIG. 3 represents stack A. Similarly, the vertical line on the right of FIG. 3 represents stack B. The vertical line in the middle of FIG. 3 represents the virtual device 204. When a node operator or a procedure issues a command to activate device THIS-HOST, both stacks A and B receive the command via a system interface to the TCP layer of the respective stack. The IF layer of stack A recognizes from system definitions the name THIS-HOST and its assignment to virtual I/O device 204. As a result, stack A generates and sends an activate request message to virtual device 204, as shown at flow 300 of FIG. 3. As shown in flow 300, this request message contains the reserved name THIS-HOST as a parameter of the request message 300. Similarly, stack B also generates an activate THIS-HOST message 302 in response to a system operator or procedure command. Virtual device 204 recognizes that both of the activate request messages 300 and 302 contain the same node name "THIS-HOST". Therefore, in response to these requests 300 and 302, virtual device 204 builds in its software separate service access point (SAP) objects to represent the stacks A and B, respectively, and it associates in its memory the two SAP objects with each other. Virtual device 204 assigns a unique token to each of the SAP objects. Virtual device 204 also returns a confirm message to each of the stacks (confirm messages are not shown for simplicity) that contains the unique token identifying the SAP object associated with the respective stack. FIG. 4 shows the stack representations in device 204, as well as representations that will be built in the stacks themselves as the message flows progress. At this point in the description, it is assumed that device 204 assigned token A to a SAP object 402 associated with stack A and token B to a SAP object 403 associated with stack B and that the SAP objects are associated with each other in device 204 memory as represented at 424. The confirm messages from device 204 to stacks A and B contain the tokens A and B, respectively. In response to the confirm message, stack A builds a SAP object 404 also associated with token A. Likewise, stack B builds a SAP object 406 associated with token B.

After stack A builds its SAP object 404, it sends at 304 an enable request to virtual device 204 identifying the protocol that is to be used across this communication connection and a token A to identify its SAP 404 to virtual device 204. Since stack A is a TCP/IP stack, the request 304 indicates in its parameter fields that the TCP protocol is the relevant protocol for the stack representation in virtual device 204. Request 304 also includes a data parameter DATA_A. DATA_A contains information that is used later to determine which stack A or B will initiate the actual connection setup request. This is described at the appropriate time below. The same set of operations occur between stack B and virtual device 204 at flow 306 of FIG. 3. In response to the enable requests 304 and 306, virtual device 204 builds a separate filter object for each stack for the TCP protocol and it associates the filter objects with each. This association between filter objects 408 and 412 is represented in FIG. 3 at 426. The filter object determines what protocol (TCP/IP in this example) will ultimately be used on the connection that is being established. In this example, it is assumed that device 204 assigns a token W to the filter object 408 associated with stack A. At 308, virtual device 204 sends an enable indication to stack A. This indication confirms that virtual device 204 is able to implement a TCP/IP protocol stack representation. The indication 308 further includes the token W assigned to the filter object 408 and the DATA_B information that was received from stack B on the 306 enable request from stack B. As a result of the 308 enable indication, stack A builds its filter object 410 and associates it with the token W. Similarly, virtual device 204 also builds a filter object 412 associated with stack B and assigns a token (X in this example) to that object. Device 204 then sends an enable indication 310 to stack B that contains this token X and the DATA_A information from stack A. In response to the enable indication 310, stack B builds its filter object 414 and associates it with token X.

Both stacks A and B are now aware of each other and can determine, when desired, if and when an end-to-end TCP/IP connection should be established and, if so, which stack should initiate the final connection. Since the end-to-end TCP/IP connection is not yet completely established, the stacks A and B communicate via device 204 using a user-defined stack protocol. DATA_A and DATA_B that each stack received from the other in flows 308 and 310 are used to make these determinations. If it is assumed that a decision is made to establish the final end-to-end connection between stacks A and B and that stack A is to initiate it, then a flow 312 is sent from stack A to virtual device 204 containing the filter token W. In response to flow 312, virtual device 204 builds an object 416 representing a new end-to-end user connection to stack A. It is assumed that device 204 assigns token Z to this end-to-end connection. Device 204 also builds a connection object 418 representing the end-to-end connection to stack B assigns token Y to this connection. These connection objects are associated with other as represented at 428 of FIG. 3. After building the connection objects 416 and 418, device 204 sends a setup indication 314 to stack B and includes the token Y to identify the new connection to stack B. In response to flow 314, stack B builds its object representation 420 of this connection and associates it with the token Y. Stack B now returns a setup response 316 to virtual device 204 to confirm this part of the setup. Setup response 316 includes token Y to identify the connection to which this indication pertains. Virtual device 204 now updates its state of the new end-to-end connection and in so doing essentially activates the connection between stacks A and B from its viewpoint. Virtual device 204 informs both stacks A and B of the activated state of the end-to-end connection. This occurs at flows 318 to stack A and at flow 320 to stack B. Flow 318 includes token Z which represents the end-to-end connection to stack A; flow 320 to stack B includes the token Y which represents the end-to-end connection to stack B. In response to connection indications 318 and 320, both stacks A and B build their object representations of the new connection and associates the connection objects with the tokens contained in the respective flows 318 and 320. Thus, stack A associates its connection object 422 with token Z and stack B associates its connection object with token Y.

After stack A builds its connection object 422, it sends at 322 an activate data request to inform virtual device 204 that stack A is ready to accept user data on the end-to-end connection. The token Z in flow 322 identifies the end-to-end connection to virtual device 204 to which stack A is referring. In response to this activate data request 322, virtual device sends an activate data indication 324 to stack B to inform it that stack A is ready to accept data. Token Y in indication 324 identifies the connection in question to stack B. When stack B is also ready to begin communications on the end-to-end connection, it sends an activate data request 326, including the token Y, to virtual device 204 and virtual device 204 sends an activate data indication 328, including token Z, to stack A to inform it that stack B is ready to receive data on the connection. The end-to-end connection between stacks A and B is now complete and ready for data communication Now assume that some application served by stack A is ready to send data to an application served by stack B. Stack A assembles the data to be communicated to stack B in a conventional and well-known manner into a plurality of buffers. Stack A next generates a data request 330 and transmits it to virtual device 204. Data request 330 includes the token Z to identify the end-to-end connection and a parameter STORE_M which contains a list of the buffers into which the data to be communicated is stored. Virtual device 204 receives the data request 330 and, in response, transmits a data indication 332 to stack B. Data indication 332 contains token Y to identify the end-to-end connection to stack B and the parameter STORE_M received in the data request message 330 which points to the buffers that contain the data being transmitted. When stack B receives data indication 332, it processes the data pointed to by STORE_M in a conventional manner and either passes it up the stack to a waiting application, or in appropriate cases transmits the data to another node for processing.

Stack B may also send data to stack A in the same fashion as described immediately above. If this is the case, stack B generates a data request 334, including token Y and a parameter STORE_N pointing to the buffers of data to be transmitted to stack A. As described above, virtual device transforms data request 334 into a data indication 336 which it transmits to stack A for processing.

Once the end-to-end connection has been established as described above and as represented by connection objects 416, 418, 420 and 422, the connection remains in place for data communication until it is torn down. While the connection is established, there is no need for the SAP and filter objects 402 through 414. These objects are only used for later connection teardown on request from a system procedure or a system operator.

Figure 5:
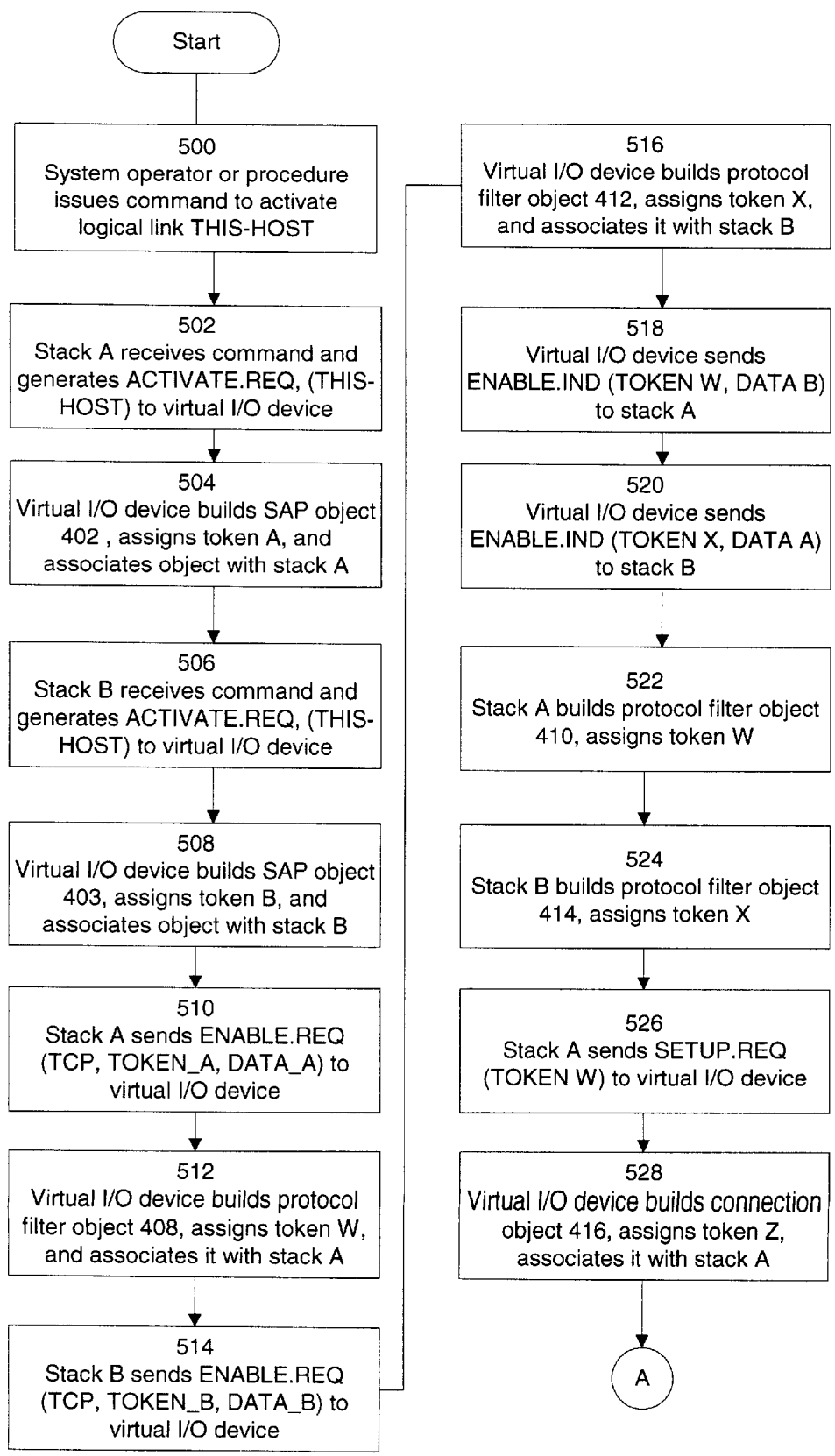
FIGS. 5 and 6 show a flowchart of steps that establish the objects of FIG. 4 and communication between the stacks.
Figure 6:
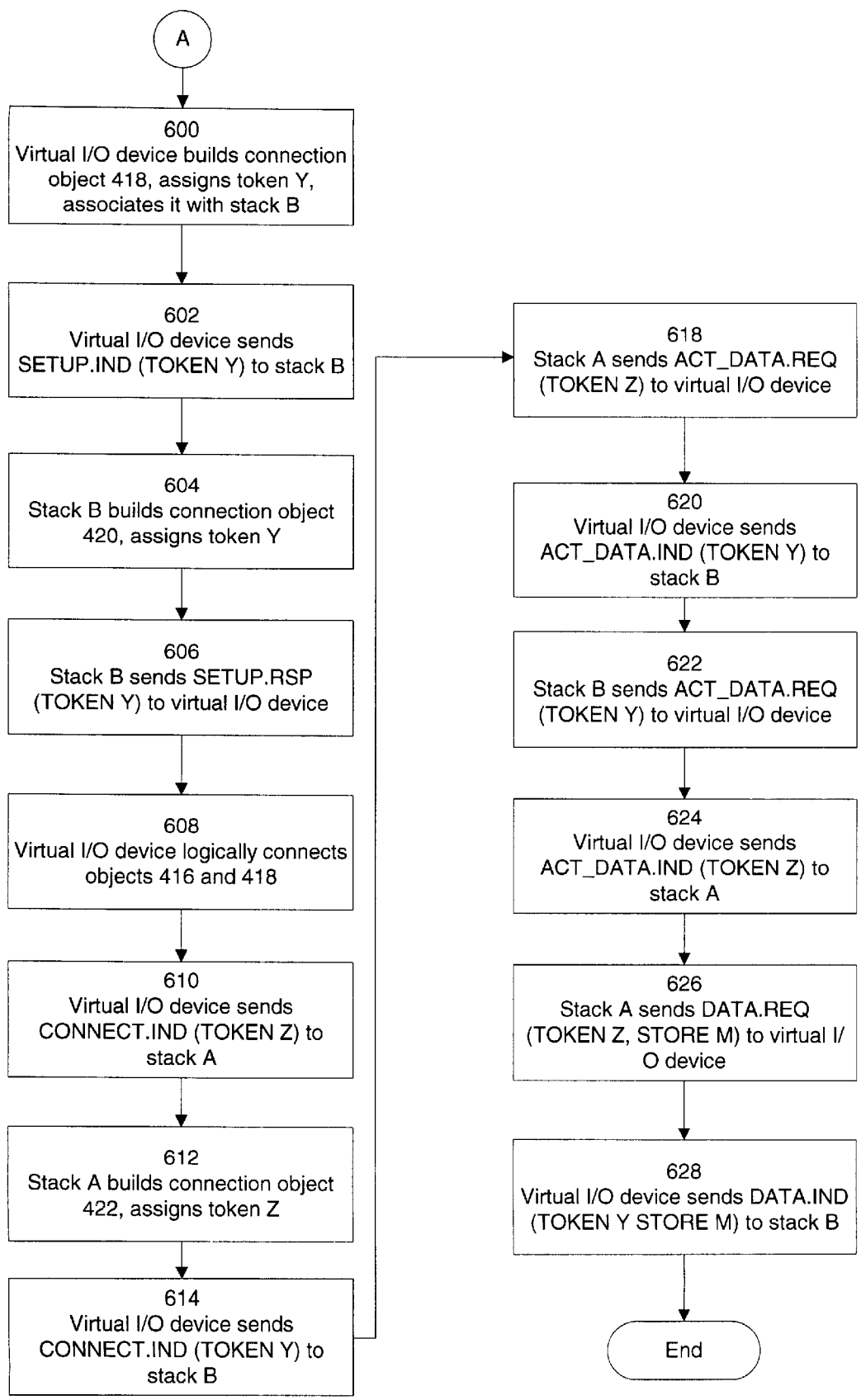

FIGS. 5 and 6 show functional flowcharts of the process described above of establishing a logical end-to-end communication path between the stacks A and B via virtual device 204. In FIG. 5, at step 500, a system operator or system procedure issues a command to activate the logical link THIS-HOST. It is recalled that THIS-HOST is a reserved name that identifies a logical link between stacks A and stack B via the virtual device 204. At step 502, stack A receives the activate THIS-HOST command, recognizes THIS-HOST as a reserved connection associated with virtual device 204, and responds by generating an ACTIVATE. REQ message to virtual device 204. THIS-HOST is included in the ACTIVATE.REQ message to distinguish this logical connection from other logical connections in which virtual device 204 may participate. At step 504, virtual device 204 responds to the ACTIVATE.REQ message by building a Service Access Point (SAP) object 402, arbitrarily assigns a token A to the SAP, and associates by means of a table entry or the like, the SAP 402 with stack A. SAP 402 is a control block that holds status, user characteristics, addresses, tokens, etc. It anchors all subsequent related objects, such as protocol filter object 408 and connection object 416 and it controls the status of these objects It is assumed that Stack B receives the activate THIS-HOST command from the system operator or system procedure at 506 and responds with an ACTIVATE.REQ (THIS-HOST) to virtual device 204. In the same manner as described for stack A, virtual device 204 responds at step 508 by building a SAP 403 for the connection to stack B. This SAP 403 is arbitrarily assigned an identifying token B.

Virtual device 204 returns confirm messages to both stacks A and B after building the SAP objects. In response to the confirm message, stack A, at step 510, sends an ENABLE.REQ message to virtual device 204. This message contains as parameters the protocol desired to be used over the logical connection being established (here, TCP), the token A assigned by virtual device 204 to stack A, and some data DATA_A. DATA_A is used later to determine which stack will initiate the final request to activate the logical end-to-end connection between the stacks A and B. In response to the ENABLE.REQ message from stack A, at step 512, virtual device 204 builds a protocol filter object 408 for stack A and assigns it a token W for identification. The purpose of the protocol filter object 408 is to identify the different protocols that are supported for possible use on the end-to-end connection and, subsequently, to negotiate with the stacks the specific protocol that will be used on the end-to-end connection.

Similarly, stack B sends an ENABLE.REQ message to virtual device 204 at step 514 in response to the ACTIVATE.REQ confirm message returned from virtual device 204. The ENABLE.REQ message also contains the protocol to be used on the end-to-end connection (TCP in this example) and some data DATA_B, as well as token B. Virtual device 204 builds a protocol filter 412 for stack B in response to this stack B ENABLE.REQ message and assigns it a token X for identification (step 516).

At step 518, virtual device 204 now sends an ENABLE.IND message to stack A to inform stack A that stack B is ready to proceed with final establishment of the end-to-end connection. The token W is included in this message to identify the filter object W in question and DATA_B from stack B is also included. Similarly, at step 520, virtual device 204 sends an ENABLE.IND message to stack B and includes the token X and DATA_A from stack A. In response to these enable indication messages, both stacks A and B build protocol filter objects 410 and 414, respectively, at steps 522 and 524. Protocol filters 410 and 414 in the stacks allow them to logically separate end-to-end connections for each supported protocol.

Stack A now consults its data DATA_A and the data DATA_B from stack B to determine which stack will initiate the final connection setup request. Stack B does the same thing with its data DATA_B and with DATA_A. Assume that in this example, both stacks conclude that stack A should initiate the connection setup request. At step 526, stack A sends a SETUP.REQ message with token W to virtual device 204. In response, at step 528, virtual device 204 builds a connection object 416 for stack A and assigns it an arbitrary and unique token Z for identification. Continuing on in FIG. 6, at step 600, virtual device 204 also builds a connection object 418 for stack B and assigns it a unique token Y. At step 602, virtual device 204 now sends a SETUP.IND message with the token Y to stack B. Stack B responds to the SETUP.IND message at step 604 by building a connection object 420. To confirm the establishment of its connection object, stack B returns a SETUP.RSP message to virtual device 204 at step 606. At step 608, virtual device 204 logically connects connection objects 416 and 418 together to partially form the end-to-end connection. At step 610, virtual device 204 informs stack A of the present progress of connection establishment by sending a CONNECT.IND message to stack A. This message includes the token Z assigned to connection object 416 to inform stack A of the identity of the connection object in virtual device 204. In response to the CONNECT.IND message, stack A builds its connection object 422 and assigns the received token Z to the object (step 612).

At step 614, virtual device 204 informs stack B of the present progress of connection establishment by sending a CONNECT.IND message to stack B. This message includes the token Y assigned to connection object 418 to inform stack B of the identity of the connection object in virtual device 204.

The end-to-end connection is essentially established at this point. The final operations are to formally activate it. To do this, at step 618, stack A sends an ACT_DATA.REQ message to virtual device 204, identifying Z as the token of the relevant connection object. At step 620, virtual device 204 responds by sending an ACT_DATA.IND, with token Y, to stack B. Stack B now updates it connection object 420 to show that the connection is active and then sends at step 622 an ACT_DATA.REQ message to confirm this fact. Virtual device 204 receives the ACT_DATA.REQ message from stack B and at step 624 informs stack A of the active connection state of stack B by sending a, ACT_DATA.IND message, with token Z, to stack A. Stack A updates its connection state in response to the ACT_DATA.IND message. The end-to-end connection is now completely operational and either stack may send user application data to the other stack at will. This is illustrated at step 626, where it is assumed that stack A sends a DATA.REQ message to stack B via virtual device 204. In this message, token Z identifies the relevant connection object Z in virtual device 204 and STORE_M identifies the location of the buffer list that contains pointers to the actual user application data to be transmitted to stack B. At step 628, virtual device 204 translates the connection token Z into the relevant token Y for stack B and sends the data to stack B with a DATA.IND (TOKEN_Y, STORE M) message.

Stack B is also able to send data to stack A via the connection objects in the same manner as discussed immediately above.

It is to be understood that the above described arrangements are merely illustrative of the application of principles of the invention and that other arrangements may be devised by workers skilled in the art without departing from the spirit and scope of the invention.

What is claimed:

1. Apparatus for interconnecting multiple protocol stacks executing an identical protocol in a single processing node for data communication between a first of the stacks and a second of the stacks, comprising a virtual input/output device implemented in software, the virtual input/output device further comprising means for building a first connection object which stores information for transmitting and receiving data packets between the first stack and the virtual input/output device, means for building a second connection object which stores information for transmitting and receiving data packets between the second stack and the virtual input/output device, and means for associating the first and second connection objects with each other, thereby establishing a logical end-to-end connection between the first and second stacks.

2. The apparatus of claim 1 wherein the means for building the first connection object and the means for building the second connection object further comprise means responsive to activate requests from the first and second stacks for building a first service access point object and a second service access point object, respectively, for controlling subsequent operation of the means for building the first and second connection objects, respectively, and means for associating the first and second service access points with each other.

3. The apparatus of claim 2 wherein the means for building the first connection object and the means for building the second connection object further comprise means responsive to first and second enable requests from the first and second stacks, respectively, subsequent to operation of the means for building the first and second service access point objects, for building a first filter object associated with the first stack and a second filter object associated with the second stack, the first and second filter objects identifying a protocol to be used by the first and second connection objects, respectively, and means for associating the first and second filter objects with each other.

4. The apparatus of claim 3 wherein the means for building the first connection object and the means for building the second connection object further comprise means responsive to setup requests from the first and second stacks, subsequent to operation of the means for building the first and second filter objects, for initiating operation of the means for building the first and second connection objects.

5. The apparatus of claim 1 wherein the first stack and the second stack further comprise a third and a fourth connection object, respectively, the third connection object being associated with the first connection object in the virtual input/output device and the fourth connection object being associated with the second connection object in the virtual input/output device, and the first and second connection objects being associated with other to result in an end-to-end connection between the third and fourth connection objects via the virtual input/output device.

6. Apparatus for interconnecting multiple protocol stacks in a single processing node for data communication between the stacks, each of the stacks operating according to an identical protocol, comprising a virtual input/output device implemented in software, means for establishing a first connection object as part of the virtual input/output device representing part of an end-to-end connection to a first one of the stacks, means for establishing a second connection object as part of the virtual input/output device representing another part of the end-to-end connection to a second one of the stacks, means for establishing in the first stack a third connection object, means for establishing in the second stack a fourth connection object, means in the first stack for associating the third connection object with the first connection object, means in the virtual input/output device for associating the first connection object with the third connection object, means in the virtual input/output device for associating the first connection object with the second connection object, means in the virtual input/output device for associating the second connection object with the fourth connection object, and means in the second stack for associating the fourth connection object with the second connection object, thereby establishing a complete virtual data communications path between the first and second stacks via the first, second, third and fourth connection objects.

7. A method of interconnecting multiple protocol stacks executing an identical protocol in a single processing node for data communication between a first of the stacks and a second of the stacks, comprising steps of activating a virtual input/output device implemented in software, establishing a first connection object in the virtual input/output device in association with the first stack, establishing a second connection object in the virtual input/output device in association with the second stack, establishing an association in the virtual input/output device between the first connection object and the second connection object, and transmitting data packets from the first stack to the second stack via the first connection object and the second connection object.

8. The method of claim 7 further comprising building the first and second connection objects in response to a request to activate the virtual input/output device.

9. The method of claim 8 wherein the building step further comprises establishing a first service access point object in association with the first stack and a second service access point object in association with the second stack, for controlling the subsequent building of the first and second connection objects, respectively, and associating the first and second service access points with each other.

10. The method of claim 9 wherein the building step further comprises establishing a first protocol filter object in association with the first stack and a second protocol filter object in association with the second stack for determining a protocol to be used by the first and second connection objects, respectively, and associating the first and second protocol filter objects with each other.

11. The method of claim 10 wherein the building step further comprises initiating the building of the first and second connection objects responsive to a setup request from the first stack, the setup request occurring subsequent to the establishment of the first and second protocol filter objects.

12. The method of claim 7 further comprising establishing a third connection object in the first stack for transmitting and receiving data between the third connection object and the first connection, establishing a fourth connection object in the second stack for transmitting and receiving data between the fourth connection object and the second connection object, thereby resulting in an end-to-end connection between the third and fourth connection objects via the virtual input/output device.

13. A computer program embodied on a computer-readable medium for enabling data communication between two stacks of a node in which both a first of the stacks and a second of the stacks are executing an identical protocol comprising, a first code segment comprising code for activating a virtual input/output device implemented in software, a second code segment for establishing a first connection object in the virtual input/output device in association with the first stack, a third code segment for establishing a second connection object in the virtual input/output device in association with the second stack, a fourth code segment for establishing an association in the virtual input/output device between the first connection object and the second connection object, and a fifth code segment for transmitting data packets from the first stack to the second stack via the first connection object and the second connection object.

14. A computer data signal embodied in a carrier wave for enabling data communication between two stacks of a node in which both a first of the stacks and a second of the stacks are executing an identical protocol comprising, a first code segment comprising code for activating a virtual input/output device implemented in software, a second code segment for establishing a first connection object in the virtual input/output device in association with the first stack, a third code segment for establishing a second connection object in the virtual input/output device in association with the second stack, a fourth code segment for establishing an association in the virtual input/output device between the first connection object and the second connection object, and a fifth code segment for transmitting data packets from the first stack to the second stack via the first connection object and the second connection object.

* * * * *